Dec. 29, 1953 — J. M. GALVIN — 2,664,054
APPARATUS FOR INJECTING FILLING WITHIN BAKERY PRODUCTS
Filed Nov. 17, 1951
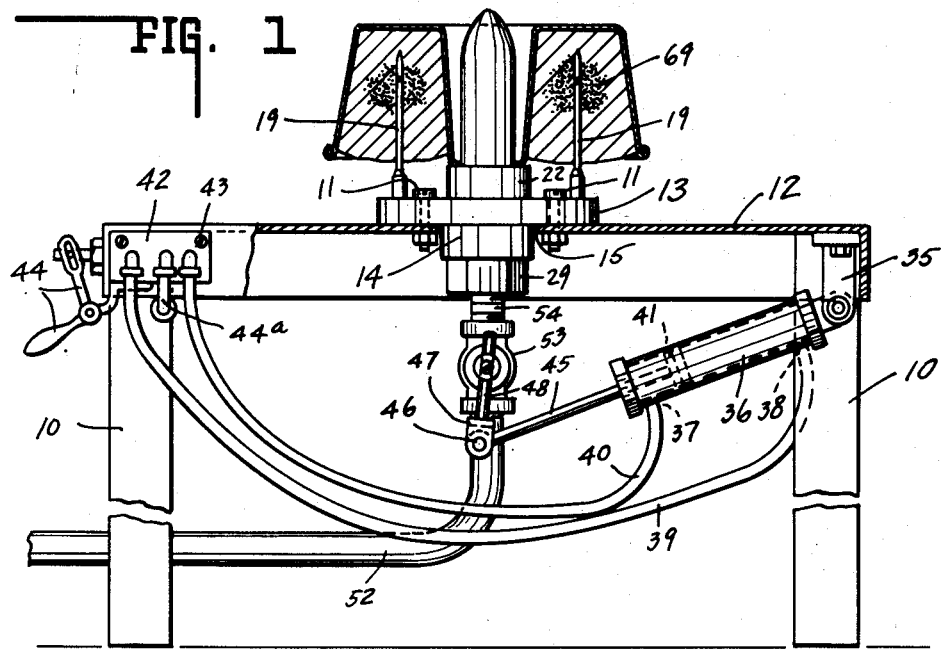
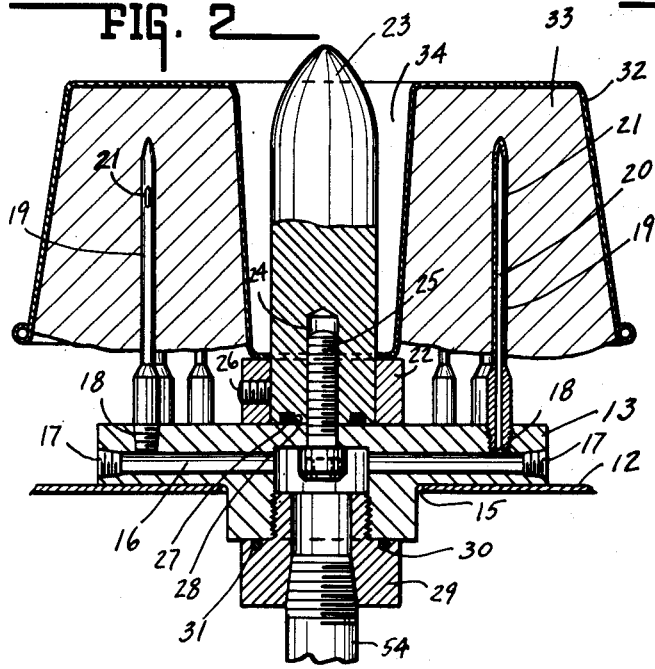
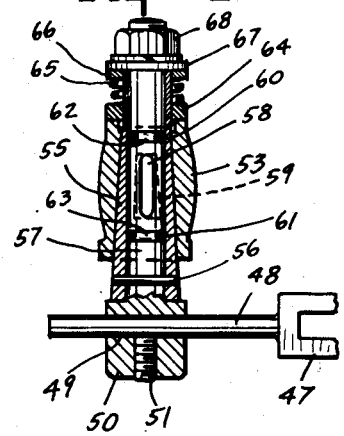
INVENTOR.
JOSEPH M. GALVIN.
BY
Lockwood, Hahn, Galt & Woodard
ATTORNEYS.

Patented Dec. 29, 1953

2,664,054

UNITED STATES PATENT OFFICE 2,664,054

APPARATUS FOR INJECTING FILLING WITHIN BAKERY PRODUCTS

Joseph M. Galvin, Indianapolis, Ind.

Application November 17, 1951, Serial No. 256,876

2 Claims. (Cl. 107—1)

This invention relates to apparatus for injecting a filling within bakery products such as cakes or the like.

As is well known, many bakery products on the market today are provided with a filling such as whipped cream, custard or the like. Such filling preparations obviously cannot be cooked with the bakery products, and it is therefore necessary to provide means for their injection within the interior of the products after they have left the oven. It is the primary object of this invention to provide an apparatus which will make possible a disposition of the preparation within the bakery product at such a time, in an expeditious and easy manner.

It is a further object of the present invention to provide control means for controlling the quantity of the preparation that is injected within the bakery product.

It is a still further object of the present invention to provide means for receiving and supporting the pan in which a cake or other bakery product is baked, so that the injection can be made prior to removal of the product from the pan.

It is a still further object of the present invention to provide a specially constructed and arranged valve which in combination with a hydraulic cylinder and its control means will make for an even and easy control of the quantity of the filling preparation that is injected into the bakery product.

The full nature of the invention will be understood from the accompanying drawings and the following description and claims:

In the drawings Fig. 1 is a side elevation view of the invention with parts thereof in vertical section.

Fig. 2 is an enlarged vertical section view of the injecting nozzles together with a header into which the filling preparation is moved under pressure from the source of supply.

Fig. 3 is an enlarged horizontal section view of the valve controlling the flow of the filling preparation into the header and from thence through the nozzles and into the bakery product.

In the drawings a table upon which a portion of the apparatus is supported, and to which another portion of the apparatus is connected is shown at 10. Connected by the bolts 11 or otherwise suitably secured to the table top 12 is the circular header 13. This header has a centrally apertured portion 14 depending therefrom and extending through an opening 15 in the top of the table. Within the header is formed a circular chamber 16 through which the filling preparation passes under pressure as hereinafter explained. In order to provide an opportunity to clean the circular chamber when desired, apertures are drilled through the wall of the header at selected points, the apertures communicating with the chamber. Plugs 17 are employed to close the apertures at such times as the apparatus is in use. Ports 18 are formed at selected intervals through the upper face of the header, these ports being disposed in spaced annular relation and communicating with the chamber. The walls defining the ports are preferably screw threaded to receive therein the nozzles 19, the lower extremities of which are externally threaded. The nozzles have a bore 20 formed longitudinally therein, and adjacent the upper extremities of the nozzles are a plurality of annularly spaced outlets 21 which permit the filler preparation to flow therethrough.

Extending upwardly from the upper face of the header is the annular socket-type member 22 within which the guide element 23 is seatable, the guide element serving a purpose which will hereinafter be described. The guide has a threaded bore 24 formed in its lower extremity for the reception of the bolt 25 or other suitable means, to enable the guide to be secured to the header. A set screw 26 may be employed as additional means to detachably retain the guide within the annular socket. In order to provide a packing or seal which will prevent any of the filler preparation from flowing along the surfaces of the bolt 25 and escaping from the header, there is provided the O ring 27 seatable within the annular groove 28 formed in the bottom face of the guide.

Connected to the depending portion of the header and having a centrally disposed bore formed therein in communication with the circular chamber of the header is the coupling member 29. In order to prevent any of the filler preparation from escaping from the coupling member there is provided the O ring gasket 30 seatable within the annular groove 31 formed in the upper face of the coupling member.

A pan 32 used to bake a product such as the cake 33, is shown bearing upon the upper face of the annular member 22. The pan disclosed is of conventional type, it having the centrally recessed portion 34. As is apparent, after the bakery product such as a cake has been baked it is possible immediately after it is taken from the oven to mount the pan in inverted relation upon the member 22 as shown particularly in Fig. 2. At such time, the nozzles will be disposed within the interior of the cake, and will of course help to support the pan while the injection process is performed.

Pivotally connected to a bracket 35 secured to the table is the hydraulic cylinder 36. Apertures 37 and 38 are formed through the walls of the cylinder to accommodate and receive the hoses 39 and 40. As is shown, one of the apertures is disposed on one side of the piston head 41 while the other is positioned on the other side thereof. Any suitable fluid may be used to actuate the piston in the well known manner. The other end of each of the hoses extends through a valve body 42 secured to the table by means of the screws 43 or any other suitable means. The hose 44a is connected to the source of fluid supply. The passage of the fluid through the respective hoses is controlled by the lever 44 in the conventional manner. When the lever is moved to one position the fluid will be fed under pressure through one of the hoses 33 and 40, and evacuated from the other, thereby causing the piston head to move in the desired direction. To move the piston head in the opposite direction, the lever is moved to another position. Since the hydraulic system constitutes no part of this invention and is of conventional type it will not be described in detail.

Connected to the piston head is the piston rod 45 which is pivotally connected at 46 to the yoke 47. The shank 48 of this yoke extends through a bore 49 formed in the valve stem head 50. A set screw 51 may be provided to retain the shank in any longitudinally adjusted position within the bore.

A filler preparation branch 52, in the form of a hose or tubing, is connected at one end to a tank (not shown) containing a supply of the filler. Pressure means of conventional type makes possible the constant feeding of the filler into the header. The opposite end of the branch is connected to the valve body 53, which body is connected by the tubing 54 to the coupling member 29. A tapered bore is fashioned within the valve body for the accommodation and reception of the tapered sleeve 55. This sleeve is keyed at 56 to the valve stem 57 and is moved therewith by the shank 48 when the hydraulic system is actuated. A slot 58 is formed through the valve stem intermediate its ends. A slot 59 is formed through the sleeve. As is apparent, when it is desired to have the filler preparation pass from the branch 52 upwardly into the chamber of the header, it is necessary that the slots of the stem and of the sleeve confront and be in communication with the branch 52. On the other hand, when it is desired to cut off the supply of the filler to the header, it is necessary only to actuate the lever 44 in such manner that the valve stem will be moved by the piston rod and by the shank to a position where the slots will be out of communication with the branch and with the tubing 54.

In order to form a seal to prevent the filler from moving out along the peripheral surface of the valve stem there are provided the O rings 60 and 61 which are seated within the peripheral grooves 62 and 63 formed in the valve stem on either side of the slot. In order to make sure that the valve stem and sleeve are held in fluid tight connection within the valve body there is provided a washer 64 upon the upper face of which bears the spring 65. A second bearing surface 66 is provided for the opposite end of the spring, this bearing surface being in the form of an annular flange connected to the valve stem. A washer 67 bears upon the member 66 and is retained in bearing relation by the nut 68. The pressure of the spring will always force the stem upwardly so that in the event of any wearing of the sleeve it will nonetheless be moved to a position where it is in fluid tight connection with the valve body.

In operation, the cake pan is placed in inverted relation upon the nozzles so that the inturned ends defining the centrally recessed portion of the pan will seat upon the annular member 22. In order to feed the filler preparation 69 into the cake or other bakery product disposed within the pan it is necessary only to actuate the hand lever 44 whereupon the shank connected to the piston rod will be rotated to a position in which the slots of the valve stem and sleeve are exposed to the branch 52 and the tubing 54 whereupon the filler will be moved under pressure into the header and from thence through the nozzle bores and out through the arcuately spaced slots formed therein. When a sufficient amount of the filler is disposed within the cake or other bakery product, the hand lever may be moved to a second position whereupon the shank will rotate the stem and sleeve to a position in which the slots are out of communication with both the branch and the tubing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In apparatus for injecting filling under pressure within bakery products, the combination of injector means with means adapted to support a receptacle for said products in operable relation to said injector means, said injector means comprising a circular header having a chamber formed therewithin, a plurality of vertically disposed nozzles carried by said header in annularly spaced relation and in communication with said chamber, and said second mentioned means comprising an annular flange connected to the upper surface of said header, an upright guide element disposed within said flange and connected to said header, said flange and said element being adapted to support a bakery pan in inverted relation whereby said nozzles project upwardly therewithin.

2. In apparatus for injecting filling under pressure within bakery products, the combination of injector means with support means for said product receptacle, said injector means comprising a circular header having a chamber formed therewithin, a plurality of annularly spaced, screw threaded openings extending upwardly through said header and in communication with said chamber, a plurality of vertically disposed, externally threaded nozzles engageable within said openings, respectively, a plurality of radial openings formed through the peripheral walls of said header and in communication with said chamber, and closure means for said radial openings, and said support means comprising an upright guide element connected to said header and having a peripheral flange formed adjacent its lower extremity for supporting a baking pan thereupon in inverted relation, whereby said nozzles project upwardly therewithin.

JOSEPH M. GALVIN.

References Cited in the file of this patent

UNITED STATES PATENTS

| Number | Name | Date |
|---|---|---|
| 1,737,069 | Barber | Nov. 26, 1929 |
| 1,787,900 | Goff | Jan. 6, 1931 |
| 1,898,004 | Demka et al. | Feb. 21, 1933 |